FREQUENCY MODULATED PHASE-LOCKED OSCILLATOR
Filed Aug. 15, 1967
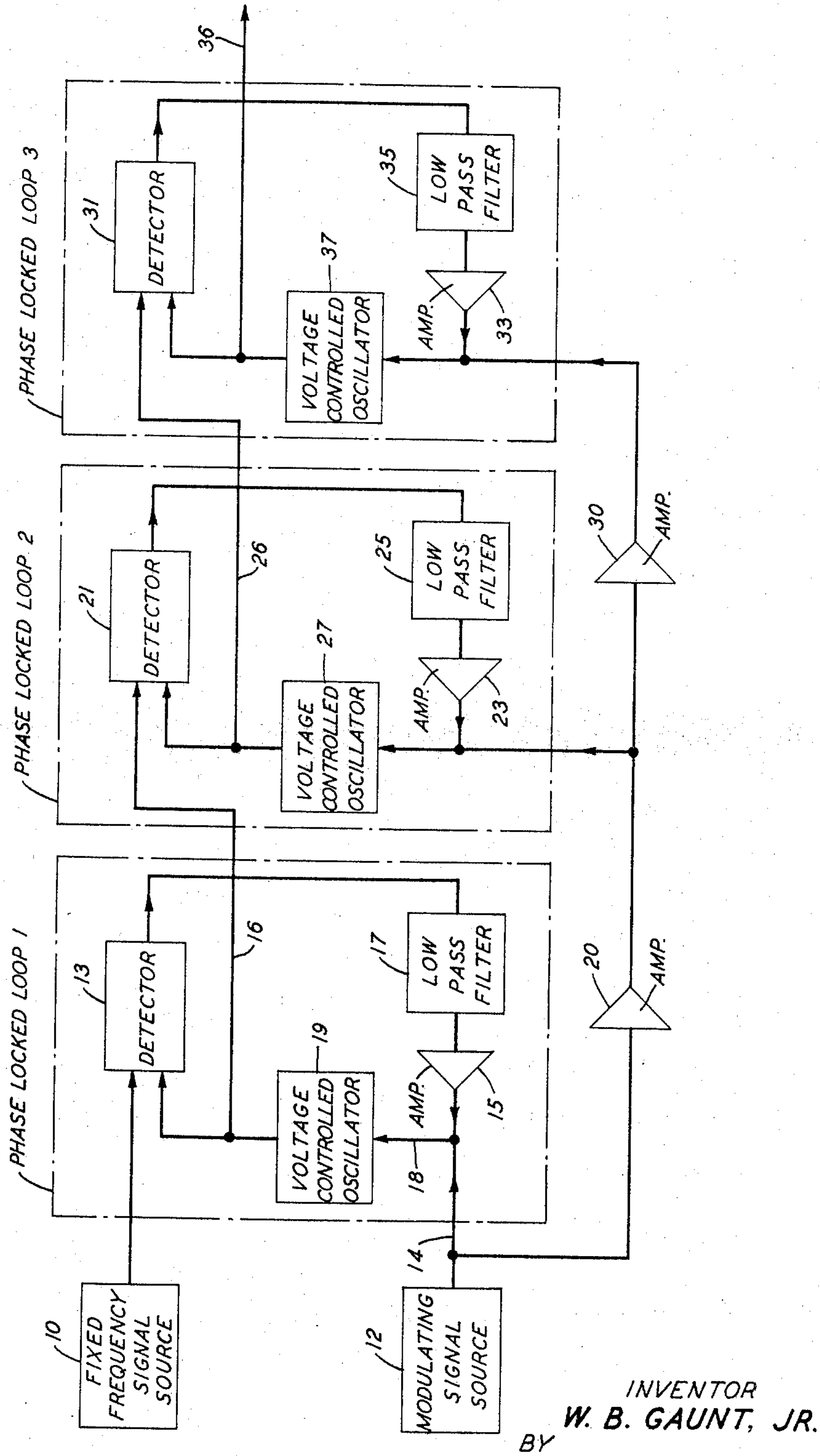
INVENTOR
W. B. GAUNT, JR.
BY
R. C. Winter
ATTORNEY 3,480,883
Patented Nov. 25, 1969

3,480,883

FREQUENCY MODULATED PHASE-LOCKED OSCILLATOR

Wilmer B. Gaunt, Jr., Boxford, Mass., assignor to Bell Telephone Laboratories Incorporated, Murray Hill, N.J., a corporation of New York Filed Aug. 15, 1967, Ser. No. 660,755
Int. Cl. H03c 3/02
U.S. Cl. 332—19 9 Claims

ABSTRACT OF THE DISCLOSURE

A frequency modulated oscillator is described in which high modulation levels can be obtained without carrier frequency drift. A fixed frequency carrier signal is applied to the phase detector of the first of a cascaded series of frequency modulated phase-locked loops. The modulated output signal from each phase-locked loop is applied to the phase detector of the succeeding loop together with the modulated output signal of that succeeding loop. A control signal from the phase detector locks the carrier frequency of each loop to that of the externally generated fixed frequency signal at modulation levels which reduce the carrier component of the modulated output to zero.

BACKGROUND OF THE INVENTION

This invention relates to transmission systems employing frequency modulation and, more particularly, to improvements in frequency modulated transmitting apparatus.

In frequency modulation communication arrangements intelligence is transmitting by varying the instantaneous frequency of the wave to be modulated at the rate of a modulating information signal. The deviation in frequency from the average frequency of the modulated wave, i.e. carrier frequency, required to faithfully transmit the intelligence, is a function of the highest modulating signal frequency. The modulation index of the modulated wave, which is defined as the ratio of the frequency deviation to the frequency of the sinusoidal modulating signal, is descriptive of the transmission bandwidth needed in the modulation circuit. The transmission bandwidth, and consequently the amount of information transmitted, is increased if a larger frequency deviation can be achieved in the modulator circuit.

As priorly known, the modulation index may be increased to extend the transmission bandwidth by means of frequency multiplication from a basic carrier frequency. There are many instances, however, where it is desired to utilize frequency modulation without resorting to frequency multiplication to adjust the value of the modulating index and thereby accommodate the system to the bandwidth of the information transmitted. Such an instance arises when a relatively low output carrier frequency is essential to the transmission system. Frequency multiplication may then be impracticable. In this case, a circuit known in the art as a phase-locked oscillator loop may be used. Included in the oscillator loop is a frequency modulator which is modulated by an appropriate information signal.

As is well known in the art, the carrier frequency of a phase-locked oscillator can be accurately controlled by an arrangement that, in effect, compares the output carrier frequency from the frequency modulator, which may comprise a voltage-controlled oscillator, with the frequency of an externally generated carrier control signal. Any deviation of the output carrier frequency from the fixed frequency of the external source is converted into an appropriate control signal which control signal is fed back to the voltage controlled oscillator to correct the aforementioned deviation.

The phase-locked oscillator scheme is appropriate if the modulation index is restricted to a value at which an output carrier signal is obtained from the oscillator loop. But at some values of modulation index ($m_f$), e.g. 2.41, the carrier frequency component of the modulated wave from the oscillator [described by the Bessel function $J_0(m_f)$] is zero, so that no carrier signal and consequently no control signal exists to correct the operation of the oscillator loop. The loop output then drifts from the fixed frequency determined by the external signal source. Therefore, according to the prior art, the modulation index of a phase-locked oscillator loop is restricted to values of $m_f$ not including those at which the carrier signal is absent and as a practical matter to values which are not in the neighborhood of such $m_f$ values.

BRIEF SUMMARY OF THE INVENTION

This invention is directed at extending the modulation index of a frequency modulated phase-locked oscillator arrangement to values of $m_f$ equal to or greater than 2.41 while maintaining accurate control of the output carrier frequency therefrom. The circuit for accomplishing this consists of a plurality of cascaded frequency modulated phase-locked oscillator loops wherein increasing modulating signals are applied to each succeeding phase-locked oscillator loop. The control signal for each oscillator is obtained by applying the modulated output signals of the oscillator and the immediately preceding oscillator to a detector. The demodulated difference signal obtained from the detector after appropriate filtering corresponds to the deviation of the carrier frequency from the frequency of an externally generated signal. This difference signal is applied to the frequency modulator of the loop so that the carrier frequency therefrom is locked to the frequency of the externally generated signal which signal is applied to the first phase-locked loop. Although the modulation index of the difference signal in any oscillator loop is limited to 2.41, the modulation index of the modulated wave from each oscillator loop may be greater without drift from the carrier frequency because of the loss of the control signal.

In the preferred embodiment to be described, a signal from a single frequency signal source, advantageously a crystal, is applied to the detector of a first oscillator loop. The signal therefrom, after filtering, is proportional to the average of the difference between the phase of the crystal frequency and the phase of the carrier signal from the loop. This resultant signal is fed back to a voltage controlled oscillator to control the carrier frequency thereof. The carrier frequency of the modulator, i.e., the voltage control oscillator, is thereby locked to the crystal controlled source. A modulating signal is also applied to the voltage controlled oscillator.

The modulated output of the first oscillator loop, the modulation index of which is less than 2.41, is applied to the detector of a second oscillator loop together with the output of the voltage controlled oscillator therein. The difference signal obtained from the detector of the second oscillator loop, after filtering, is then fed back to its voltage controlled oscillator to which an amplified modulating signal is also applied. The modulation index of the phase difference component, derived by substrating the first loop output signals from the second loop output signals in the detector of the second loop, is limited to 2.41; but the modulation index of the output of the second voltage controlled oscillator may be twice as great before the carrier signal is reduced to zero. By utilizing a third oscillator loop similarly arranged, the modulation index of the transmitting apparatus may be extended further while the carrier frequency therefrom is locked to the external crystal controlled source.

DESCRIPTION OF THE DRAWING

The drawing depicts frequency modulated transmitting apparatus in accordance with this invention.

DETAILED DESCRIPTION

The drawing shows a preferred embodiment of a frequency modulated transmitter which illustrates this invention. In the drawing, source 10 generates a fixed frequency signal to which the carrier frequencies of each of phase-locked loops 1, 2 and 3 are to be locked. Modulating signals from source 12 are applied directly to phase-locked loop 1 and through amplifiers 20 and 30 to the remaining phase-locked loops 2 and 3, respectively, so that the modulating signals applied to each oscillator are proportionally increased in strength at each succeeding loop. The modulating signal applied to loop 1 is restricted in accordance with the hereinbefore discussed limitations so that the modulation index ($m_f$) of loop 1 is less than 2.41. But in accordance with this invention the modulating signals applied to succeeding phase-locked loops may be further amplified to provide greater values of $m_f$ from the succeeding loops 2 and 3. While the transmitting apparatus may comprise any number of phase-locked loops, three are shown by way of example. Phase-locked loops 1, 2 and 3 are connected in cascade. It is to be understood that other loops may be added in cascade without departing from this invention.

Each phase-locked loop includes a voltage controlled oscillator that operates as a frequency modulator. The frequency of the signal from a voltage controlled oscillator, as is well known in the art, is a function of the voltage applied to its input. In the absence of an input signal, a single frequency carrier signal is generated by the oscillator. When a modulating signal is applied, the frequency of the signal from a voltage controlled oscillator varies in accordance with the instantaneous modulating voltage. In phase-locked loop 1, the modulating signals from source 12, which may comprise audio frequency signals, are coupled to voltage controlled oscillator 19 via lines 14 and 18 to control the frequency deviation therein and the rate at which the instantaneous frequency in oscillator 19 varies from the carrier frequency. The maximum frequency deviation is, of course, limited as hereinbefore noted.

The output signals from source 10 and oscillator 19 are both applied to detector 13, which may comprise a product detector or other detection circuits well known in the art .Detector 13 demodulates signals applied thereto. The output of this detector contains signal components corresponding to the difference in phase between the signal from external signal source 10 and the frequency modulated signal from oscillator 19. These phase difference components, corresponding to the difference in frequency between the two signals, are applied to filter 17 which permits only the low frequency portion, e.g., D.C. to 100 c.p.s., to appear at the input of oscillator 19 after amplification in amplifier 15. The output signal from amplifier 15 is therefore a function only of the phase difference between the signal from source 10 and the carrier signal from oscillator 19. The filtered difference signal represents the long term deviation of the carrier frequency signal of oscillator 19 from the desired carrier frequency determined by source 10 and corresponds to the average value of the demodulated phase difference. The feedback arrangement between detector 13 and oscillator 19 permits a control signal to be applied to oscillator 19 to minimize the deviation of the carrier frequency of loop 1 from the fixed frequency of source 10.

Filter 17 may be omitted so that the fed back signal includes the entire demodulated signal. In this case, the phase-locked loop may be arranged so that the control signal acts to stabilize the transmission of the modulating signals as well as to minimize the carrier frequency deviation.

If the frequency deviation of the modulated wave from oscillator 19 is such that the modulation index equals 2.41, the value of the Bessel function describing the carrier frequency component of the wave is zero, and the carrier frequency component of the modulated wave disappears. In this event, the difference signal from detector 13 does not contain the carrier signal component of oscillator 19 and is no longer proportional to the deviation of the carrier frequency of loop 1 from the frequency of the signal from source 10. Consequently, there is no longer an appropriate control signal fed back to oscillator 19, and the carrier frequency therefrom is not locked to the frequency of source 10. Thus, the feedback loop is rendered ineffective, and the carrier frequency of the modulated wave from loop 1 may drift. It is therefore required that the modulation index $m_f$ of loop 1 be limited to 2.41.

The frequency modulated signal from loop 1 appears on the output of oscillator 19 and is transmitted to detector 21 via lead 16. Detector 21 is a part of phase-locked loop 2 which operates in substantially the same manner as loop 1. The modulating signal from source 12, however, is not directly applied to loop 2 but is amplified by amplifier 20 and thereafter coupled to voltage controlled oscillator 27.

This amplified modulating signal may cause the modulation index of the output wave from oscillator 27, which appears on lead 26, to be equal to or exceed 2.41. The carrier frequency of loop 2 is still locked to the frequency of the signal from source 10 because only the phase difference component from detector 21 is limited to values of $m_f$ less than 2.41. But the phase difference component from detector 21 is responsive to the phase difference between the modulated signals from oscillators 19 and 27.

Since the modulated output signals of oscillators 19 and 27 are derived from the same modulating signal, the phases of the carrier components of these output signals are in effect subtracted from each other in detector 21 so that the modulation index of the difference signal is less than 2.41. Therefore, the modulation index of the signal from oscillator 27 may be in the neighborhood of 2.41 and may be almost as large as 4.82 if the $m_f$ of oscillator 19 is just less than 2.41. The $m_f$ of the difference signal remains less than 2.41 although the $m_f$ of the frequency modulated signal from oscillator 27 greatly exceeds that value.

The carrier frequency component from loop 1 is locked to the fixed frequency of source 10 so that any deviation in the carrier frequency signal of oscillator 27 from the fixed frequency of source 10 causes a control signal to be fed back to oscillator 27 via low pass filter 25 and amplifier 23. This control signal, coupled to the input of oscillator 27 from filter 25 and amplifier 23, is therefore effective to lock the carrier frequency component from oscillator 27 to the crystal frequency of source 10.

The modulation index of the frequency modulated transmitter shown in the drawing may be further increased by applying the output of loop 2 to another phase-locked loop. In loop 3, the outputs from oscillators 27 and 37 are coupled to detector 31 and the modulating signal from amplifier 20 is further increased by amplifier 30 before it is applied to voltage controlled oscillator 37. Because only the modulation index of the signal corresponding to the phase difference between signals from oscillators 27 and 37 need be less than 2.41, the index $m_f$ of the modulated wave from oscillator 37 may be increased to a value just less than 7.23.

At modulation indices below 7.23, the signal fed back via low pass filter 35 and amplifier 33 from detector 31, which signal is proportional to the average difference between the phase of the carrier frequency component of the modulated wave from oscillator 37 and the phase of the carrier frequency component of the wave from oscillator 27, is effective to lock the carrier frequency of loop 3 to the frequency of source 10. Additional phase-locked loops may be added in similar fashion to increase the modulation index of the frequency modulated transmitter to any value desired while the carrier frequency of the modulated wave therefrom is locked to the frequency of the signal from the fixed frequency applying means.

The principles of this invention have been described with reference to a particular embodiment. It is to be understood that numerous other arrangements may be devised by those skilled in the art without departing from the scope and spirit of this invention.

What is claimed is:

1. Signal transmitting apparatus comprising a plurality of circuit connected in cascade each comprising means for generating a modulated carrier signal and means for producing a control signal connected in series with said generating means, means for applying a fixed frequency signal to said control signal producing means in the first of said cascaded circuits, said control signal producing means in said first of said cascaded circuits comprising means responsive to the frequency difference between said modulated carrier signal from said first circuit and said fixed frequency signal, said control signal producing means in each succeeding one of said cascaded circuits comprising means responsive to the frequency difference between said modulated carrier signal from said succeeding circuit and the preceding circuit in the cascade, means for applying a modulating signal to the generating means of each of said circuits, and means for applying the control signal from each of said circuits to the generating means of the same circuit whereby the carrier frequency in each of said circuits is locked to the frequency of said fixed frequency signal.

2. Signal transmitting apparatus according to claim 1 wherein said control signal producing means in the first of said cascaded circuits comprises means responsive to the phase difference between said first circuit modulated signal and said fixed frequency signal, said control signal producing means in each of said succeeding circuits comprises means responsive to the phase difference between the modulated signals generated in each of said succeeding circuits and the modulated signal received from the preceding circuit, and said means for applying a modulated signal to each of said circuits comprises means for applying modulating signals of progressively increasing magnitude to each succeeding circuit.

3. Signal transmitting apparatus according to claim 2 wherein said means for applying modulating signals of progressively increasing magnitude to each succeeding circuit comprises a plurality of amplifiers connected in cascade, the modulating signal from each of said cascaded amplifiers being transmitted to the generating means of a corresponding one of said circuits.

4. Signal transmitting apparatus according to claim 2 wherein said control signal producing means in each of said circuits comprises means for demodulating said phase difference and wherein said means for applying said control signal to each of said generating means comprises means for applying a signal responsive to only the average value of said demodulated phase difference.

5. A frequency-modulated oscillator for obtaining high modulation levels without carrier frequency drift comprising a cascade of closed loops, each having a voltage controlled oscillator for producing a modulated carrier signal and a detector connected in series, means for applying a fixed frequency signal to said detector in the first loop of the cascade, means for applying a modulating signal to each of said voltage controlled oscillators, means for applying the output of said voltage controlled oscillator in each loop to said detector in the succeeding loop, each of said detectors producing a control signal corresponding to the phase difference between said received signals, and means for applying said control signal in each loop to said voltage controlled oscillator in the same loop.

6. A frequency-modulated oscillator in accordance with claim 5 wherein said control signal applying means comprises a low pass filter and an amplifier connected in series.

7. A frequency-modulated oscillator in accordance with claim 5 wherein said modulating signal applying means comprises cascaded amplifiers for applying an increased modulating signal to each succeeding loop in the cascade.

8. A frequency-modulated oscillator according to claim 5 wherein said detector comprises a product detector and wherein said control signal produced by each of said detectors comprises a signal proportional to the phase difference between said received signals.

9. A frequency modulator comprising an oscillator generating a modulated carrier signal and a detector connected in a closed loop, means for applying a modulating signal to said oscillator, and means for applying a fixed frequency signal to said detector together with the modulated carrier signal output of said oscillator, said detector providing an output signal corresponding to the difference in phase between said carrier signal and said fixed frequency signal to lock the frequency of said oscillator carrier signal to said fixed frequency, characterized in that means connect a plurality of said closed loops in cascade to extend the modulation index of said frequency modulator, the output of said oscillator in each loop being applied to said detector in the succeeding loop in the cascade and said modulating signal being applied to said oscillator in each succeeding loop at a progressively amplified level.

References Cited

UNITED STATES PATENTS

| | | | |
|---|---|---|---|
| 2,501,368 | 3/1950 | White | 331—2 X |
| 2,942,203 | 6/1960 | Winkler | 331—2 |

ROY LAKE, Primary Examiner

L. J. DAHL, Assistant Examiner

U.S. Cl. X.R.

331—2